United States Patent
Bormann et al.

(10) Patent No.: US 6,802,666 B1
(45) Date of Patent: Oct. 12, 2004

(54) SEALING CONNECTING ELEMENT, SEALING END PIECE AND A SEAL

(75) Inventors: Josef Bormann, Harsum (DE); Gero Wedderkopf, Hildesheim (DE)

(73) Assignee: Meteor Gummiwerke K.H. Badje GmbH & Co., Bockenem (DE)

( * ) Notice: Subject to any disclaimer, the term of this patent is extended or adjusted under 35 U.S.C. 154(b) by 0 days.

(21) Appl. No.: 09/554,402

(22) PCT Filed: Nov. 4, 1998

(86) PCT No.: PCT/EP98/07032

§ 371 (c)(1),
(2), (4) Date: May 11, 2000

(87) PCT Pub. No.: WO99/24279

PCT Pub. Date: May 20, 1999

(30) Foreign Application Priority Data

Nov. 12, 1997 (DE) .................................... 297 20 053 U (51) Int. Cl.[7] .............................................. E06B 7/23
(52) U.S. Cl. ...................... 403/233; 403/235; 49/479.1; 49/482.1; 296/93
(58) Field of Search ................................ 277/626, 627, 277/630; 403/169, 331, 175, 223, 396, 233, 235; 49/479.1, 482.1; 296/146.9, 93

(56) References Cited

U.S. PATENT DOCUMENTS

| 213,577 | A | * | 3/1879 | Kennedy | ..................... 285/331 |
| 1,325,804 | A | * | 12/1919 | Salvati | ..................... 403/169 |
| 2,899,720 | A | * | 8/1959 | Vollmer | ..................... 49/479.1 |
| 3,522,359 | A | * | 7/1970 | Marshall | ..................... 403/293 |
| 3,778,175 | A | * | 12/1973 | Zimmer | ..................... 403/187 |
| 4,447,065 | A | * | 5/1984 | Dupuy et al. | |
| 4,582,987 | A | * | 4/1986 | Bianco | ..................... 235/385 |
| 4,712,826 | A | | 12/1987 | Omori | |
| 4,749,203 | A | * | 6/1988 | Bright | |
| 4,759,555 | A | * | 7/1988 | Halling | |
| 5,007,761 | A | | 4/1991 | Wulff et al. | |
| 5,271,687 | A | * | 12/1993 | Holka et al. | ................ 403/233 |
| 5,297,360 | A | * | 3/1994 | Besore et al. | .............. 49/479.1 |

(List continued on next page.)

FOREIGN PATENT DOCUMENTS

| DE | 42 43 043 A | 6/1994 | |
| DE | 36 29 343 A | 3/1998 | |
| EP | 378 419 A | 7/1990 | |
| EP | 395 444 A | 10/1990 | |
| EP | 0395 444 | * 10/1990 | |
| JP | 58224810 A | * 12/1983 | .............. B60J/5/04 |
| JP | 59-195416 A1 | * 11/1984 | |
| JP | 1-186447 | 7/1989 | ........... B60R/13/06 |

OTHER PUBLICATIONS

JPO Abstract, Publication No. 01186447.*
Patent Abstracts of Japan vol. 13, No. 473 (M–884), Oct. 26, 1989 & JP 01 186447 A (Nishakawa Rubber). Jul. 1989.
Patent Abstracts of Japan vol. 8, No. 80 (M–289), Apr. 12, 1984 & JP 58 224810 A (Nissan Jidosha), Dec. 27, 1983.

*Primary Examiner*—Anthony Knight
*Assistant Examiner*—Ernesto Garcia
(74) *Attorney, Agent, or Firm*—Synnestvedt & Lechner LLP (57) ABSTRACT

The invention relates to a sealing connecting element, a sealing end piece and a seal. In practice different seals are known which are produced as three dimensional structures and then given to the customer. The production, wherein profile strips are ready-made by cutting and adhesion to form the three dimensional structures or wherein the three dimensional structure is obtained by means of corner injection molding, is very costly. In order to simplify the production of seals, it is provided in accordance with the invention that sealing connecting elements and/or sealing end pieces are to be produced as separate molded parts made of a thermoplastic elastomer and these molded parts to be connected, shortly before the installation of a seal, to sealing profile strips to form a complete seal.

4 Claims, 6 Drawing Sheets

U.S. PATENT DOCUMENTS 5,566,510 A * 10/1996 Hollingshead et al. ..... 49/479.1
5,575,485 A * 11/1996 Merla et al.
5,575,580 A * 11/1996 Parrish et al. .............. 403/396
5,690,446 A * 11/1997 Poissant et al. ............ 403/169
5,785,447 A * 7/1998 Fonti et al. ................. 403/396
5,964,062 A * 10/1999 Jinma et al.
6,138,338 A * 10/2000 Berry ......................... 264/152
6,354,634 B1 * 3/2002 Dischler .................... 285/331

* cited by examiner

SEALING CONNECTING ELEMENT, SEALING END PIECE AND A SEAL

BACKGROUND

The invention relates to a sealing connecting element, a sealing end piece and a seal.

Seals are used in a number of areas of daily life, in order to seal off specific spaces from each other or from the environment in a liquid- and/or gas-tight manner. A particularly important area of application for seals is that of doors and flaps, at which in part large sealing gaps regularly occur owing to inaccuracies in the assembly process.

One particular area of application for seals is motor vehicle construction, in which there are usually extremely high demands placed upon the sealing behavior of a seal and its load capability with respect to environmental influences, such as temperature fluctuations, UV-radiation, the influence of solvents and other environmental factors. In order to be able to guarantee a long serviceable life under possibly extreme environmental conditions, it is known in practice to use elastomer seals. The materials most frequently used for these types of elastomer seals are EPDM (ethylene-propylene-diene-copolymers), NBR (natural butadiene rubber), NR/SBR-blends and CR-materials (controlled rheology polypropylene materials).

It is known in practice to process the said materials to form strip profiles which are then tailored to suit the specific requirements by being cut and adhered to form three-dimensional structures. It is also known in practice to connect the EPDM-sealing profiles at their corners by means of a TPE-V-injection molding technique (book: Thermoplastische Elastomere—Herausforderung an die Elastomerverarbeiter/VDI-Gesellschaft Kunststofftechnik, [thermoplastic elastomers—challenge to the elastomer manufacturers/VDI-Gesellschaft synthetic material technology], VDI-Verlag GmbH 1997, page 145). In the said three-dimensional structures, the seals are then given to the customers who install them into vehicles or other structures.

In order to be competitive in the market, it is necessary to provide in a rapid manner large quantities of seals which can be assembled in a convenient manner. Owing to its flexibility during processing, the sealing strip material places high demands upon the persons employed in the manufacturing process.

It is known per se from JP 01 186447 A to insert the end faces of two sealing profile strips into a hard polyamide coupling piece and to adhere them together.

It is known per se from JP 58 224810 A to seal window sealing profiles, which abut each other in a flush manner, with respect to each other by virtue of a locally integrally-formed sealing lip.

DE 36 29 343 A1 illustrates as being known per se a corner connector with tapered mandrels and in each case a profile strip is attached and adhered thereto with a hollow space.

It is known per se from U.S. Pat. No. 4,712,826 A to attach a window to the bodywork of a motor vehicle. For this purpose, the window, sealing profiles and a corner piece are placed in position. Then, the intermediate spaces are filled with a sealing adhesive.

According to EP 0 395 444 A1, an end cap is pushed in a manner known per se on to an open end face of a clamping profile, the clamping profile having been placed on to a bodywork flange beforehand.

It is known per se from EP 0 378 419 A1, FIGS. 1 and 5, to attach a holding device for a rear-view mirror to a window channel structure. The holding device comprises an end piece which is partially coated with polymer. Connection spigots of adjoining frame profiles have a rectangular cross-section and are inserted into an open receiving channel of the end piece.

U.S. Pat. No. 5,007,761 illustrates as known per se the releasable connection of a window compartment seal to a door seal for a coupé. A transition piece is vulcanized to the window compartment seal. The transition piece comprises a recess, into which it is possible to insert an upper end of the door seal from below. In this inserted state, the connection is secured in an axial manner by virtue of a claw of the transition piece, which claw engages into a complementary recess of the door seal.

In accordance with DE 42 43 043 A1, it is known per se to attach together in a flush manner two ends of a clamping profile which comprises a textile coating. The clamping profile comprises a sealing tube, into the hollow space of which a complementary, rubber-elastic spigot is introduced in each case with a part of its length as a coupling element.

SUMMARY OF THE INVENTION

It is the object of the invention to simplify the production of seals.

The object is achieved in accordance with the invention by a sealing connecting element for connecting in a sealing manner at least one first and one second sealing profile strip whose ends are not aligned with each other, and which sealing connecting element is formed separately from the sealing profile strips as a molded part with a profile guide region from a thermoplastic elastomer. The profile guide region of the connecting element moves into position against an outer wall of an inserted sealing profile strip. The invention further provides a sealing end piece for sealing profile strips which are formed separately from the sealing profile strips as a molded part with a profile guide region from a thermoplastic elastomer, wherein the profile guide region moves into position against an outer wall of an inserted sealing profile strip. The invention further provides a seal having at least one sealing profile strip and one sealing connecting element according to the above.

It is provided in accordance with the invention, to produce sealing connecting elements and/or sealing end pieces as separate molded parts from a thermoplastic elastomer and only to connect these molded parts to sealing profile strips to form a complete seal shortly prior to the installation of a seal. The fact that the sealing connecting elements and/or sealing end pieces on the one hand or sealing profile strips on the other hand are produced separately and are transported separately serves on the one hand to simplify the production of the individual parts and on the other hand serves to minimize the transportation cost. Whereas it is necessary in the prior art to position sealing profile strips manually in a corresponding mold for the connection by means of an adhesive or an injection-molded TPE-corner piece, it is possible for the production of the sealing connecting elements and sealing end pieces according to the invention to be fully automated.

After transporting the individual sealing parts which requires less space than complete seals, the said sealing parts can then be joined together in the form of a kit to form complete seals, in that sealing profile strips are moved into position against the profile guide regions of the sealing connecting elements or sealing end pieces, wherein it is possible to join said sealing parts together in a particularly convenient manner if longer sealing profile strips are already attached and thus fixed to a rigid structure.

The thermoplastic elastomer sealing connecting elements and sealing end pieces in accordance with the invention provide a kit component which renders it possible when mounting a seal on a structure, which is not produced to precise dimensions, to react rapidly and readily by virtue of the fact that instead of a sealing profile strip of a predetermined length, a different sealing profile strip is used which has an individually tailored length. This minimizes assembly costs and rejects.

The kit concept which forms the basis of the seals in accordance with the invention and the sealing connecting elements and/or sealing end pieces used in said seals is particularly advantageous if large-capacity seals or small production-lots of seals are to be produced, since the ease of handling and the possibility of using standard components are particularly beneficial aspects.

Preferably, the profile guide region is formed having a thin wall, so that the arrangement between the outer contour of the sealing profile strip and the outer contour of the sealing connecting element is only slightly offset. This offset arrangement and an associated failure in the sealing arrangement can be minimized further if the profile guide region runs out to zero, i.e. the region tapers to a point.

In the case of motor vehicle bodywork seals for the purpose of sealing the engine compartment, it is often desired to seal an installation part separately after providing a peripheral seal. At such points, three sealing profile strips meet each other and must be connected together. In order in this case to reduce the risk of failures in the sealing arrangement and to reduce assembly costs, it is advantageous to design a holding portion of the sealing connecting element in such a manner that it can be attached to a continues sealing profile strip.

A particularly convenient assembly process is achieved if the sealing connecting element in accordance with the invention comprises a holding portion for clamping the connecting element to a sealing profile strip which is to be connected. In this case, it is possible to dispense with the process of adhering or welding the sealing connecting element to the respective sealing profile strip.

If an adhesion or welding process is performed to guarantee a permanent connection of the individual sealing components, it is advantageous to provide the sealing connecting elements with a stop which is formed as a counter bearing for sealing profile strips which are to be connected to the connecting element in an inserting manner. This type of design ensures straightforward assembly, particularly if the sealing connecting elements have a small overdimension with respect to the respective sealing profile strips.

The production of complicated seals in small production-lots is simplified if different sealing connecting elements, which are preferably mirror-symmetrical with respect to a miter plane, are available with respect to a sealing profile strip type. In a similar manner to sanitary installation waste water pipe bends, these sealing connecting elements can then be joined together in an extremely convenient manner with sealing profile strips to form a desired three-dimensional structure.

Further advantageous embodiments and developments of the invention are evident in the subordinate claims and in the drawings in conjunction with the description.

DETAILED DESCRIPTION

Figure 1:
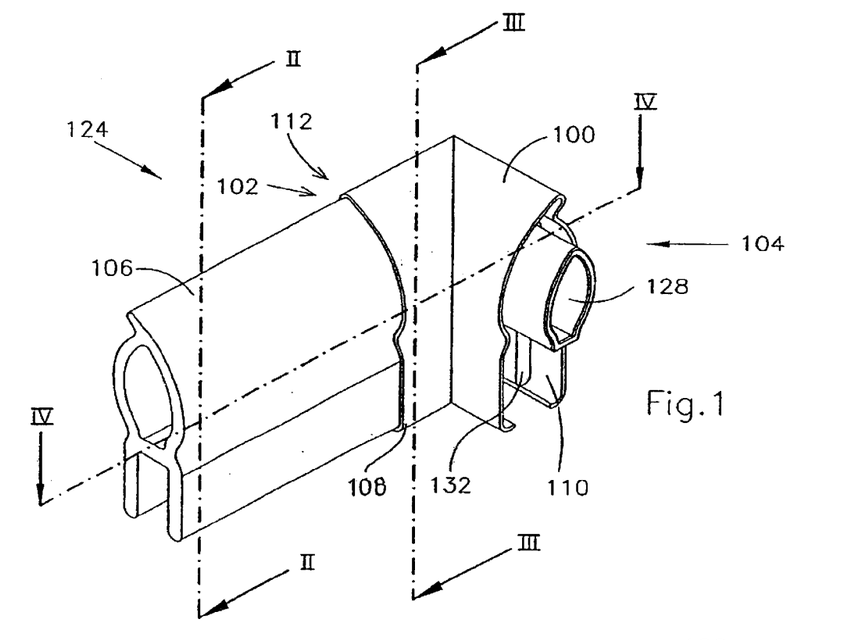
FIG. 1 shows a first embodiment of a sealing connecting element in accordance with the invention having an inserted sealing profile strip.
Figure 2:
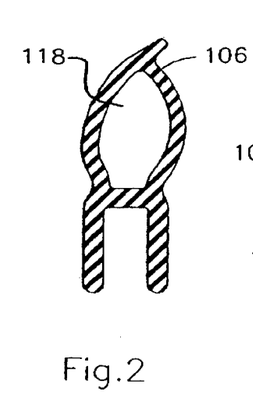
FIG. 2 shows a sectional view of the sealing connecting element in FIG. 1 along the line II—II in FIG. 1.
Figure 3:
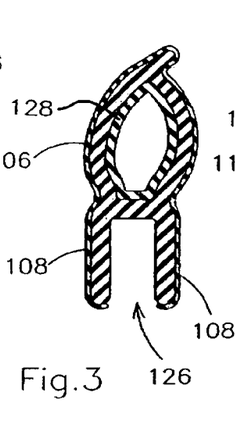
FIG. 3 shows a sectional view of the sealing connecting element and the sealing profile strip in FIG. 1 along the line III—III in FIG. 1.

The sealing connecting element 100 according to a first embodiment as illustrated in FIGS. 1 to 4 is provided as a 90° corner piece for an engine compartment seal 124. It is formed in a symmetrical manner with respect to a miter plane and comprises a first insertion end 102 and a second insertion end 104 for receiving sealing profile strips 106. As seen in FIG. 1, the two sealing profile strips 106 extend longitudinally in different directions at the point of connection via the connecting element 100, here each of the two profile strips 106 extending longitudinally at 90° from one another.

Figure 4:
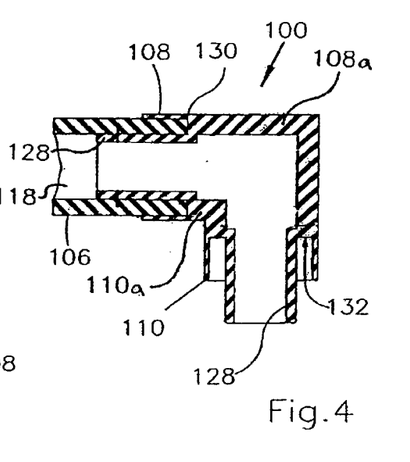
FIG. 4 shows a sectional view of the sealing connecting element and the sealing profile strip in FIG. 1 along the line IV—IV in FIG. 1.

In the region of the insertion ends 102, 104, the sealing connecting element 100 has thin-walled profile guide regions 108, 110 which move into position against the outer wall of an inserted sealing profile strip 106 in such a manner that only a minimal step 112 remains between the sealing profile strip and the sealing connecting element and this step does not have a significant effect upon the sealing behavior of the seal 124. As illustrated in FIG. 4, the thin-walled profile guide regions 108, 110 generally comprise wall regions that are thin relative to wall regions 108a and 110a respectively. In certain preferred embodiments, the thin-walled profile guide regions of the present invention are tapered. In even more preferred embodiments, the thin-walled profile guide regions are tapered to a point.

Figure 5:
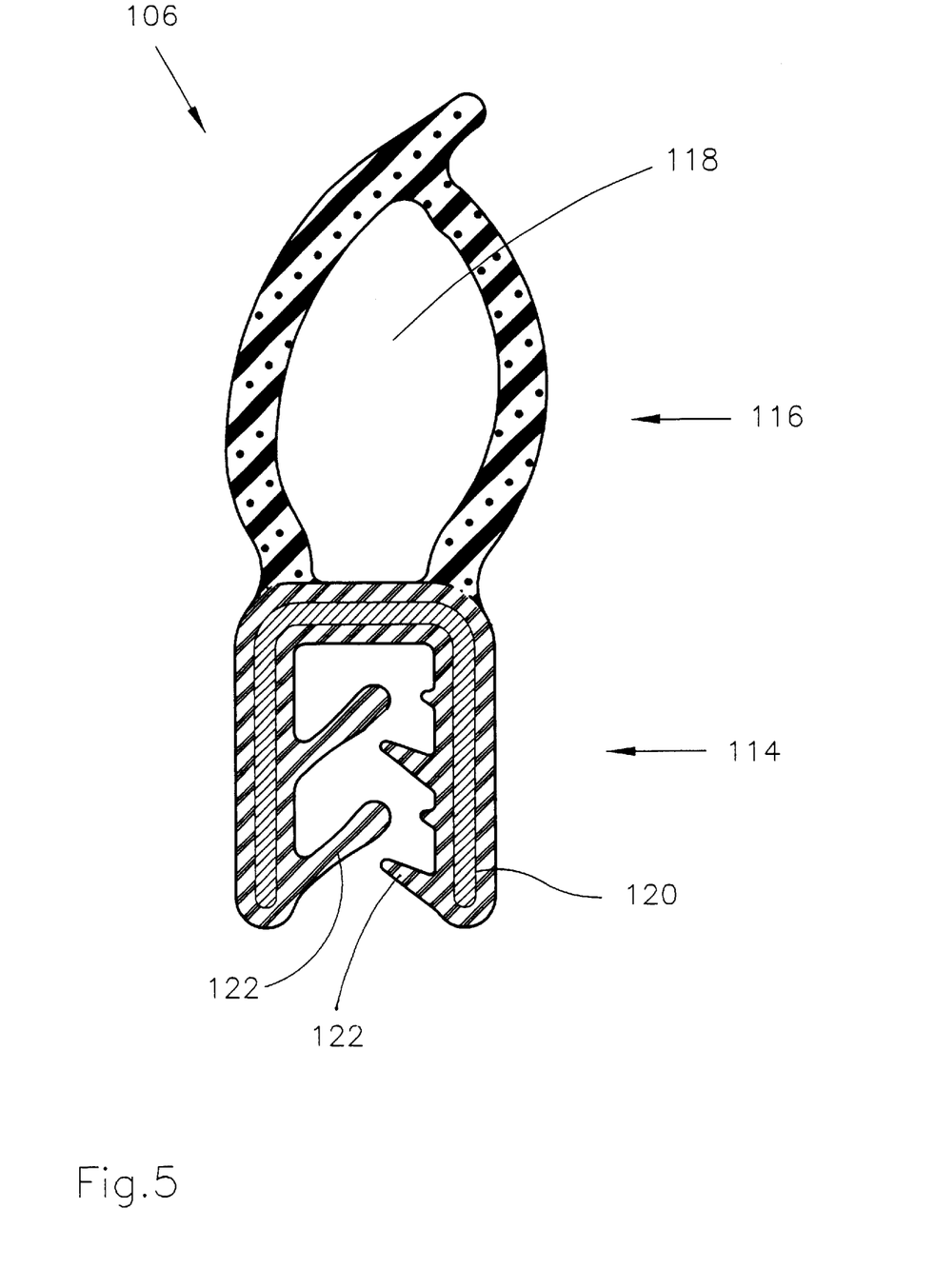
FIG. 5 shows an enlarged view of the sealing profile strip in FIGS. 1 and 4.

The sealing connecting element 100 according to the first embodiment is provided for a sealing profile strip 106 made from EPDM which is illustrated in detail in FIG. 5. This sealing profile strip 106 comprises a base region 114 for attaching the sealing profile strip 106 to a metal cross-piece [not illustrated] and comprises a sealing region 116 made from cellular rubber with a Shore-hardness of 15 which together with the base region 114 forms a channel-like hollow chamber 118. The base region 114 encloses in a dense rubber (Shore hardness of 60) a metal insert 120 which has a U-shaped cross-section and provides the base region 114 of the sealing profile strip 106 with the level of rigidity required for the support on the metal cross-piece. In order to hold the sealing profile strip 106 in a fixed manner on the metal cross-piece, resilient projections 122 are provided.

The sealing connecting element 100 is formed in such a manner that its outer contour follows the progression of the sealing profile strip 106. Consequently, a metal cross-piece, on to which there is placed a seal 124 consisting of sealing profile strips 106 and sealing connecting elements 100, is completely enclosed which can prevent the metal cross-piece from becoming corroded. Only in the attachment region of the base region 114 of the sealing profile strip 106 does the sealing connecting element 100 comprise an opening which permits a clamping connection of the sealing profile strip 106 and the metal cross-piece.

In order to be able to guide the sealing profile strip 106 in an effective manner on the sealing connecting element 100 and to simplify the assembly process, the sealing connecting element is provided with a core portion 128 which is chamfered on its edge and whose cross-sectional profile is tailored to suit the cross-sectional profile of the hollow chamber 118.

The sealing connecting element 100 comprises in the region of its first and second insertion end 102, 104 stops 130, 132, against which it is possible to push sealing profile strips 106 which are to be inserted. If sealing profile strips 106 which are used have been pre-cut in a precise manner, it is possible by taking these stops 130, 132 into consideration to produce extremely dimensionally accurate seals.

The sealing connecting element 100 is injection-molded from a thermoplastic elastomer, preferably from a polymer blend or a block copolymer and in particular from TPE-V in a fully automated process. During the injection-molding process, the form which is mirror-symmetrical with respect to the miter plane only requires two cores which can be drawn in an automated manner. The properties of the thermoplastic elastomer material used are such that it is possible to deform the sealing connecting element 100 in its sealing region 116 by at least 50% of its height extension.

Figure 6:
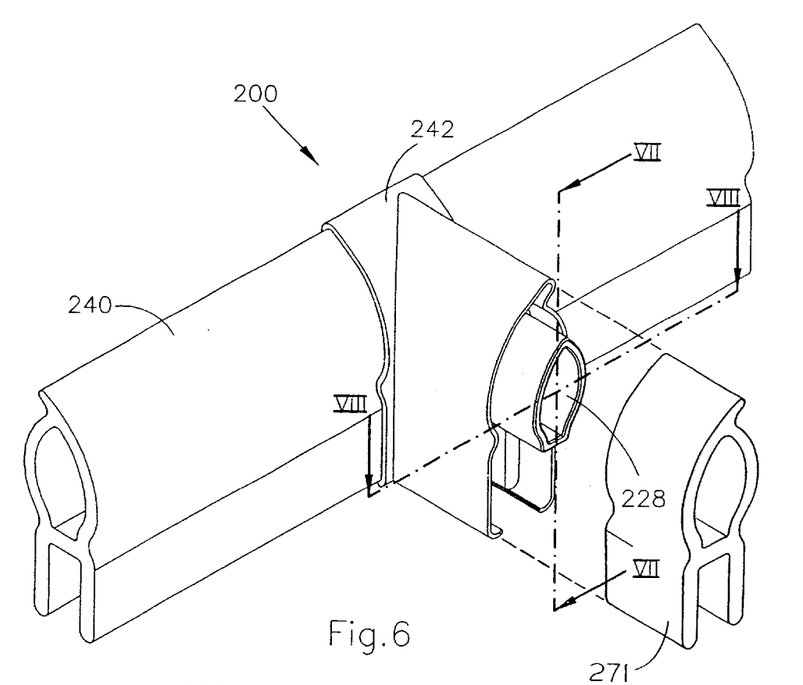
FIG. 6 shows a second embodiment of a sealing connecting element according to the invention, which is clamped in a lateral manner to a continues sealing profile strip.
Figure 7:
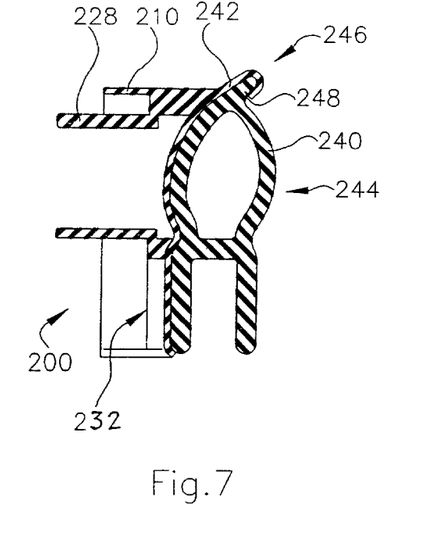
FIG. 7 shows a sectional view of the sealing connecting element and the sealing profile strip in FIG. 6 along the line VII—VII in FIG. 6 and 8.
Figure 8:
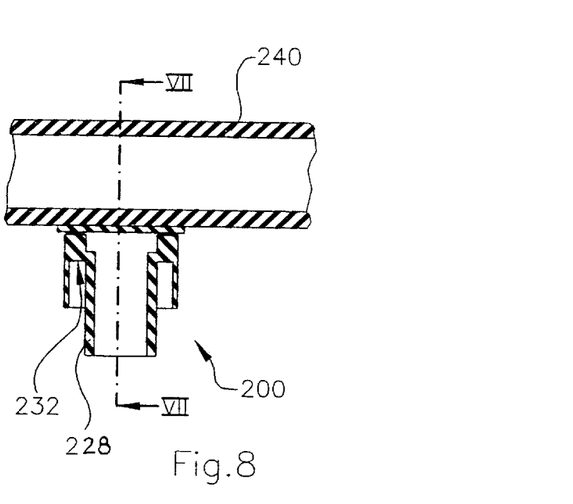
FIG. 8 shows a sectional view of the sealing connecting element and the sealing profile strip in FIG. 6 along the line VIII—VIII in FIG. 6.

The sealing connecting element 200 according to a second embodiment as illustrated in FIGS. 6 to 8 is designed with respect to the connection to a first sealing profile strip in such a manner that it corresponds to the design of the sealing connecting element 100 according to the first embodiment in the region of its insertion ends 102, 104. For the purpose of describing the sealing connecting element 200 according to the second embodiment, reference numerals which are increased by the value 100 with respect to the corresponding reference numerals in the first embodiment will therefore be used to describe regions which correspond to regions of the sealing connecting element 100 according to the first embodiment. Reference is made to the corresponding description.

The sealing connecting element 200 having a core portion 228 is provided for an abutting connection of a first sealing profile strip 271 on a continuous second sealing profile strip 240. The continuous sealing profile strip 240 has the same features as the sealing profile strip 106. In order to guarantee a seamless transition from the first sealing profile strip to the second, continuous sealing profile strip 240, the profile guide region 210 of the sealing connecting element 200 is drawn through up to a holding portion 242 which on its upper end lying against the sealing region 244 of the sealing strip profile 240 comprises a hook 246 which engages around a sealing projection 248 of the second sealing profile strip 240. The holding portion 242 is formed in such a manner that it adapts to the outer contour of the second sealing profile strip 240.

The sealing connecting element 200 according to the second embodiment can be produced from a thermoplastic elastomer in an injection-molding process in the same manner as the sealing connecting element 100 according to the first embodiment, wherein only two cores are required for this purpose.

FIGS. 9 to 12 illustrate a sealing connecting element 300 made from TPE according to a third embodiment. This sealing connecting element 300 is a simplified embodiment in comparison to the sealing connecting element 100 according to the first embodiment, so that for portions which correspond to portions of the sealing connecting element 100 in accordance with the first embodiment, reference numbers are used which are increased by 200. Reference is made to the corresponding description.

Figure 9:
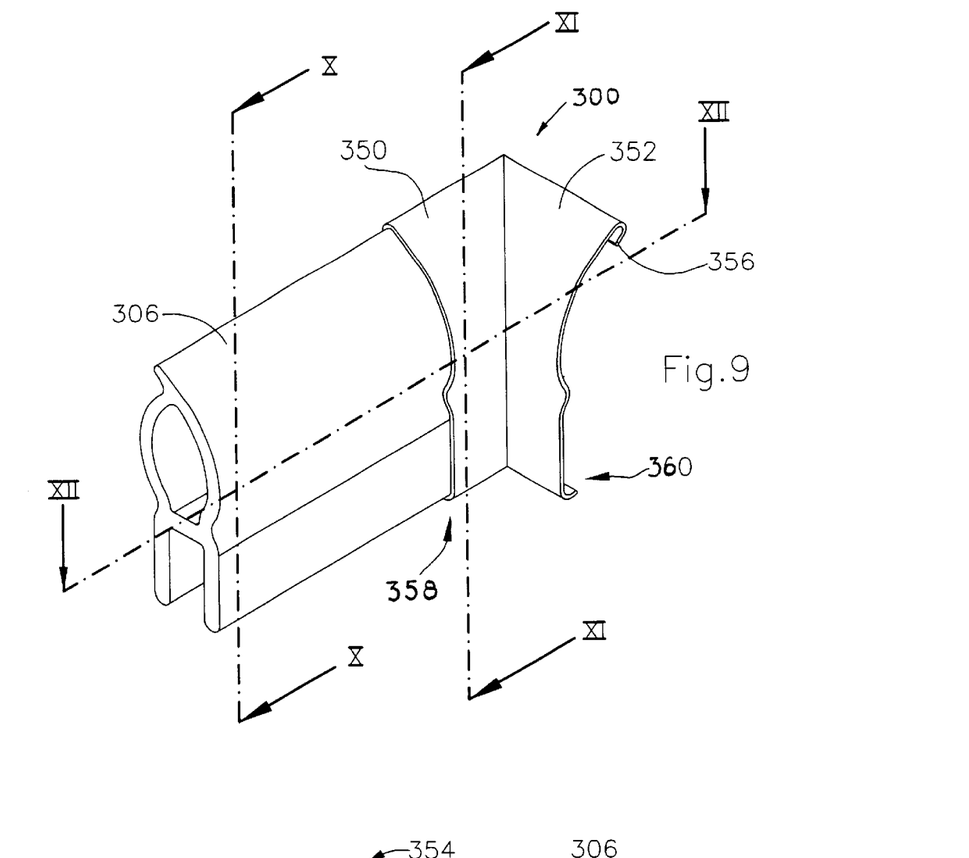
FIG. 9 shows a third embodiment of a sealing connecting element according to the invention having a sealing profile strip.
Figure 10:
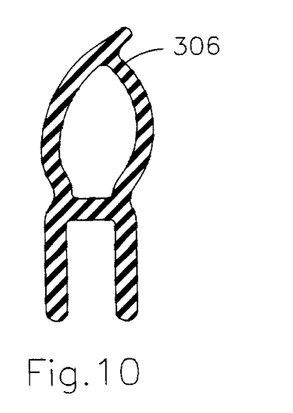
FIG. 10 shows a sectional view of the sealing profile strip in FIG. 9 along the line X—X in FIG. 9.
Figure 11:
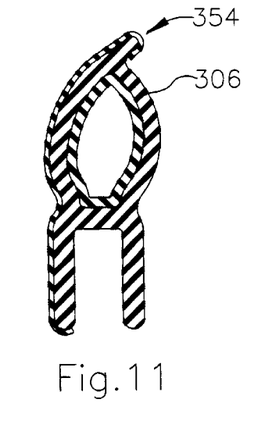
FIG. 11 shows a sectional view of the sealing connecting element and the sealing profile strip in FIG. 9 along the line XI—XI in FIG. 9.
Figure 12:
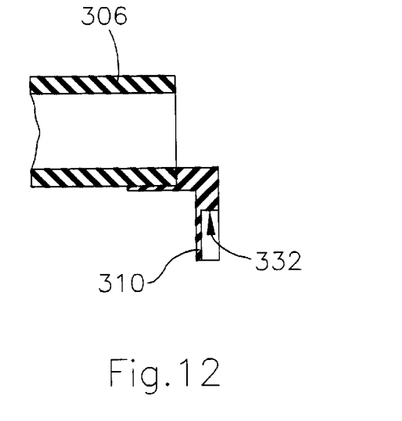
FIG. 12 shows a sectional view of the sealing connecting element and the sealing profile strip in FIG. 9 along the line XII—XII in FIG. 9.
Figure 13:
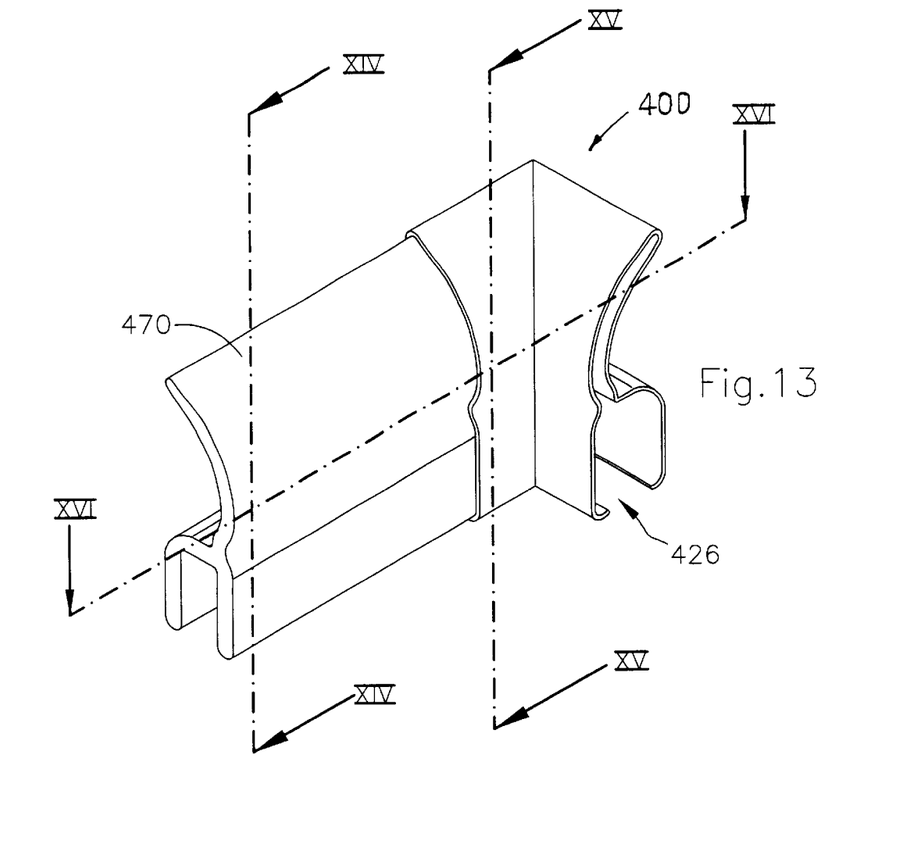
FIG. 13 shows a fourth embodiment of a sealing connecting element according to the invention having a sealing profile strip.
Figure 14:
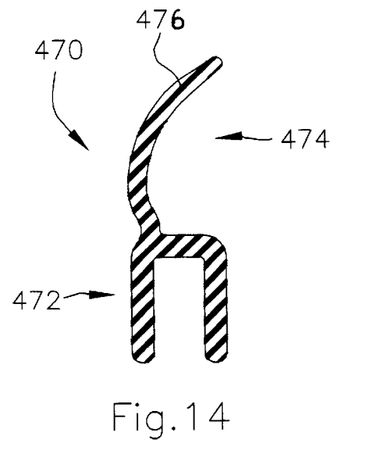
FIG. 14 shows a sectional view of the sealing profile strip in FIG. 13 along the line XIV—XIV in FIG. 13.
Figure 15:
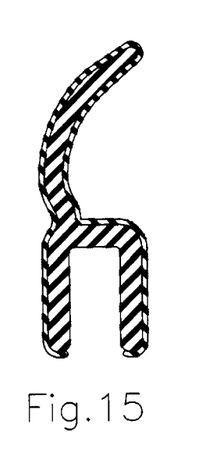
FIG. 15 shows a sectional view of the sealing connecting element and the sealing profile strip in FIG. 13 along the line XV—XV in FIG. 13.
Figure 16:
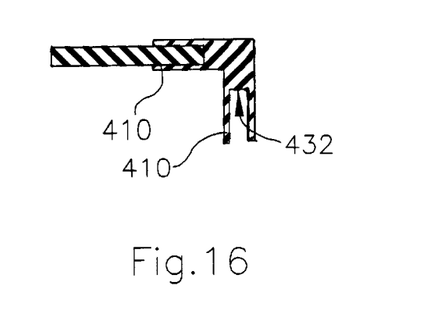
FIG. 16 shows a sectional view of the sealing connecting element and the sealing profile strip in FIG. 13 along the line XVI—XVI in FIG. 13.

The sealing connecting element 300 consists substantially of two holding portions 350, 352 being formed in such a manner that they adapt to a related sealing profile strip 306. Both the holding portions 350, 352 end in a common miter plane extending at 45° with respect to the longitudinal extension of the holding portion 350, 352. At their upper ends the holding portions comprise a hook 354, 356 by means of which the sealing connecting element 300 is fixedly held on the sealing profile strips 306. At the lower end of the sealing connecting element 300 each holding portion 350, 352 is provided with a counter bearing portion 358, 360 which prevents slippage of the sealing connecting element 300 from the respective sealing profile strips. As seen in FIG. 12, the profile guide region 310 moves into position against the outer wall of the inserted sealing profile strip 306, the sealing profile being insertable up to and against the stop 332.

The sealing connecting element 300 is especially simple to produce by means of injection molding and requires only extremely low expenditure on materials. It has the disadvantage that bluntly cut ends of sealing profile strips are left open both in the sealing region and the base region.

In FIGS. 13 to 16 a sealing connecting element 400 is shown, which sealing connecting element is provided for sealing profile strips 470 in accordance with a second embodiment. These sealing profile strips 470 comprise a base region 472 corresponding with respect to its formation having an inner metal insert (not shown) and with holding projections (not shown), to the base region 114 of the sealing profile strip 106 as shown in FIGS. 1 to 5. However, in its sealing region 474 the sealing profile strip 470 does not comprise a chamber, but only a sealing lip 476. This sealing lip 476 and the base region 472 are encompassed by the sealing connecting element 400 according to the fourth embodiment, wherein only the attachment region 426 remains free. A profile guide region 410 moves into position against the outer wall of the inserted sealing profile strip 470, the sealing profile being insertable up to and against the stop 432. The sealing connecting element 400 according to the fourth embodiment, which can be produced from a thermoplastic elastomer in an injection-molding process in the same manner as the other sealing connecting elements, represents a particularly effective compromise between the material consumption and sealing behavior, wherein it should be emphasized that the entire base region 472 of the sealing profile strips is sealed, even if the sealing profile strips are cost-effectively separated in a transverse manner with respect to their longitudinal extension.

Figure 17:
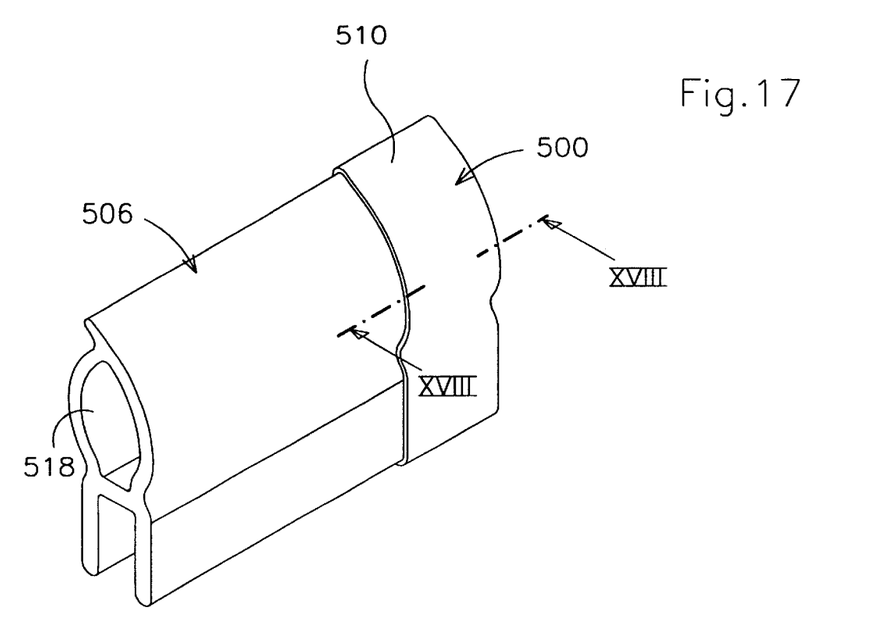
FIG. 17 shows a sealing end piece in accordance with the invention having an inserted sealing profile strip.
Figure 18:
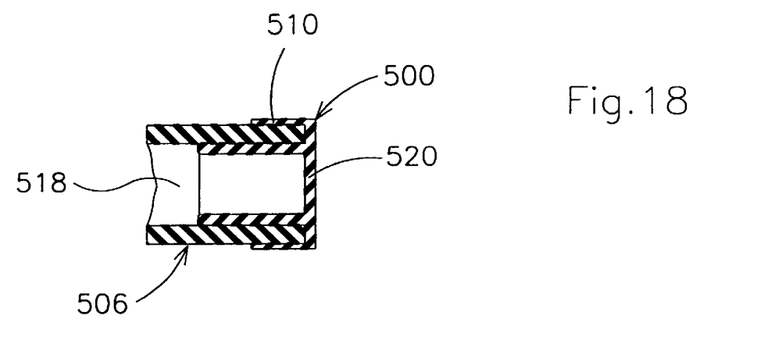
FIG. 18 shows a sectional view of the sealing end piece and the sealing profile strip in FIG. 17.

The sealing end piece 500, shown in FIGS. 17–18, comprises a profile guide region 510 which is movable into position against an outer wall of at least one sealing profile strip 506 upon insertion of said profile strip into said profile guide region. Sealing end piece 500 further comprises an end wall 520 for sealing a hollow chamber 518 of said profile strip 506. The sealing end piece is formed separately from the sealing profile strips as a molded part from a thermoplastic elastomer.

What is claimed is:

1. A sealing connecting element for sealingly connecting at least one end of a first sealing profile strip to a second sealing profile strip, said connecting element comprising:
    at least one profile guide region having an insertion end for receiving one of said sealing profile strips, said profile guide region being movable into position against an outer wall of said one sealing profile strip upon insertion of said one sealing profile strip into said insertion end;
    at least one first stop positioned to abut an end face of at least one of said sealing profile strips and fix a forward position of said at least one sealing profile strip within said profile guide region;
    a holding portion for clamping said sealing connecting element to said first sealing profile strip and a holding portion capable of attaching to the second sealing profile strip between two ends of the second sealing profile strip;
    said sealing connecting element being configured such that said first and second profile strips extend in different longitudinal directions from said connecting element upon connection of said first and second profile strips to said connecting element; and
    said sealing connecting element being formed as a molded part separately from said profile strips.

2. A sealing connecting element for sealingly connecting at least one end of a first sealing profile strip to a second sealing profile strip, said connecting element comprising:
    at least one profile guide region having an insertion end for receiving one of said sealing profile strips, said profile guide region being movable into position against an outer wall of said one sealing profile strip upon insertion of said one sealing profile strip into said insertion end;
    at least one first stop positioned to abut an end face of at least one of said sealing profile strips and fix a forward position of said at least one sealing profile strip within said profile guide region;
    a holding portion capable of attaching to the second sealing profile strip between two ends of the second profile strip;
    said sealing connecting element being configured such that said first and second profile strips extend in different longitudinal directions from said connecting element upon connection of said first and second profile strips to said connecting element; and
    said sealing connecting element being formed as a molded part separately from said profile strips.

3. A sealing connecting element for sealingly connecting at least one end of a first sealing profile strip to a second sealing profile strip, wherein at least one of said first and second sealing profile strips has a hollow chamber, said connecting element comprising:
    at least one profile guide region having an insertion end for receiving one of said sealing profile strips, said profile guide region being movable into position against an outer wall of said one sealing profile strip upon insertion of said one sealing profile strip into said insertion end;
    at least one first stop positioned to abut an end face of at least one of said sealing profile strips and fix a forward position of said at least one sealing profile strip within said profile guide region;
    at least one core portion insertable into a hollow chamber of said first or second sealing profile strip for attaching said hollow chamber upon connection of said first or second sealing profile strip having a hollow chamber to said connecting element;
    a holding portion capable of attaching to the second sealing profile strip between two ends of the second profile strip;
    said sealing connecting element being configured such that said first and second profile strips extend in different longitudinal directions from said connecting element upon connection of said first and second profile strips to said connecting element; and
    said sealing connecting element being formed as a molded part separately from said profile strips.

4. A sealing connecting element for making a first connection to an end of a first sealing profile strip and a second connection to a second sealing profile strip, said connecting element comprising:
    a first connection end, for making the first connection, comprising a profile guide region having an insertion end for receiving said first sealing profile strip, said profile guide region being movable into position against an outer wall of said first sealing profile strip upon insertion of said first sealing profile strip into said first connection end and having a section contoured to match an outer section of said first profile strip;
    a second connection end, for making the second connection, comprising a section contoured to match an outer section of said second profile strip and a holding portion configured to engage an outer surface of the second profile strip between two ends of the second sealing profile strip and which does not engage said entire outer surface, but engages only a section thereof; and
    said sealing connecting element being formed as a molded part and configured such that said first and second profile strips extend in different longitudinal directions from said first and second connection ends.

* * * * *